United States Patent [19]

Doderer

[11] 4,428,205
[45] Jan. 31, 1984

[54] APPARATUS AND METHOD FOR DEHUMIDIFICATION SYSTEMS

[75] Inventor: Earl S. Doderer, San Antonio, Tex.

[73] Assignee: Trinity University, San Antonio, Tex.

[21] Appl. No.: 257,549

[22] Filed: Apr. 27, 1981

[51] Int. Cl.³ .......................................... F25D 17/06
[52] U.S. Cl. ......................................... 62/93; 165/66; 62/95
[58] Field of Search ..................... 62/271, 93; 165/66, 165/DIG. 12, 59, 29; 237/2 B

[56] References Cited

U.S. PATENT DOCUMENTS

| | | | |
|---|---|---|---|
| 2,237,332 | 4/1941 | Bretzlaff et al. | 62/93 |
| 2,935,856 | 5/1960 | Gifford | 62/93 |
| 4,018,584 | 4/1977 | Mullen | 62/93 |
| 4,071,080 | 1/1978 | Bridgers | 165/66 |
| 4,142,575 | 3/1979 | Glancy | 165/66 |

Primary Examiner—Edward G. Favors
Assistant Examiner—Henry Bennett
Attorney, Agent, or Firm—Cox & Smith Incorporated

[57] ABSTRACT

A method and apparatus for controlling the atmosphere in a controlled environment including passing air into a cooling means to remove humidity and back into the environment and exchanging heat from the air entering the cooling means to the air exiting the cooling means, to increase dehumidification by a cooling recovery process.

4 Claims, 5 Drawing Figures

APPARATUS AND METHOD FOR DEHUMIDIFICATION SYSTEMS

BACKGROUND OF THE INVENTION

This invention relates generally to an apparatus and method for maintaining a controlled environment. More particularly, the invention relates to an energy efficient dehumidifier which may be used alone or in connection with passive cooling systems to maintain a comfortable environment more efficiently.

In America the use of air conditioning is common place and considered by most to be a necessity. A significant portion of the energy use in America is consumed by air conditioning.

This was of little concern to America during the period of cheap energy costs. However, this ended with the era of the oil embargo and it is believed to be generally accepted that the days of cheap energy are gone forever.

The large amounts of energy used by America have placed a financial strain on the economy particularly with regard to the balance of payments and is viewed by many as even a greater threat to America. The large dependence upon imported oil still remains even though the source of supply of imported oil is volatile and cannot be guaranteed. The high cost of oil from OPEC has resulted in some conservation. Thermostats have been lowered in winter and raised in the summer to attempt to produce energy consumption. A great deal of work is also being performed in the area of passive cooling to provide comfortable controlled environments with low energy costs.

Passive cooling, however, cannot reliably remove humidity from the air because the cooling does not ordinarily reach the dew point temperature. Accordingly, although passive cooling can provide temperatures in the comfortable range, these temperatures may not be satisfactory in conditions of high humidity. Dehumidification is therefore required.

Commercially available room air dehumidifiers are relatively inefficient and conventional air conditioners waste considerable energy if only dehumidification is desired by providing cooling not only redundant with but actually detrimental to the passive cooling system. The air conditioning can make the environment uncomfortable by unnecessarily reducing the temperature in order to remove humidity which significantly affects the comfort in the environment.

The problem of providing dehumidified air to a controlled environment is well known. Known methods of doing this are shown in U.S. Pat. Nos. 2,715,320, 3,293,874, 3,460,353, 3,921,413 and 4,189,929. Since a source of heat is readily available in conventional air conditioning units, one need only provide a heating coil in connection with the cooling coil so that the air which has been produced to the dew point temperature to provide dehumidification is heated to a desired temperature before entering the room. While this type of system is workable it does not increase the efficiency of the apparatus. Rather, it provides the desired results at a similar cost to conventional air conditioning.

It is also well known in the art that heat exchangers can be utilized in connection with ventilating and heating systems. Examples of such heat exchangers are shown in U.S. Pat. Nos. 1,825,498, 2,092,835, 2,945,680, 4,194,538, 4,222,436. These devices usually include a means for bringing in fresh outside air and transferring heat from the exhausted inside air to the incoming outside air to reduce the heat loss.

With the large increases in the cost of energy, a need has arisen for a highly efficient apparatus and method for providing a comfortable controlled environment. Much of this effort has apparently been directed to increase the efficiency of conventional air conditioning systems. While this has reduced energy consumption, it has not provided an answer to the problem. It is believed that the present invention prides a solution to the long felt need for an efficient apparatus and method for controlling environments. The apparatus and method of the invention feels this long felt need for providing an efficient and workable solution to controlling environments. Other objects of the invention will become apparent from the following detailed description in the specification.

SUMMARY OF THE INVENTION

A method and apparatus for variable cooling and dehumidifying or just dehumidify air for a controlled environment including a cooling means for reducing the dew point of air flowing across the cooling means to provide dehumidification through condensation. A heat transferring means is also provided to remove heat from the air entering the heat transferring means and to transfer this heat to the air exiting the cooling means to increase the efficiency of dehumidification by recovering the cooling potential of cold air exiting the cooling means.

BRIEF DESCRIPTION OF THE THEORY AND EXPERIMENTAL ANALYSIS

The essential components of the system are a cooling means and a heat transferring means. The cooling means must be able to reduce the dew point of the air coming from the conditioned environment. This cooling could be accomplished by an electrically driven vapor compression cycle device such as a conventional air conditioner or an electric refrigerator. It could also be accomplished by an absorption chiller powered by natural gas, solar, coal, etc., or it could be effected by chilled water, or some other chilled fluid or solid with cooling obtained from any source.

The heat transferring means could be an air-to-air heat exchanger with a wide variety of internal configurations and materials, an air-to-air heat exchanger utilizing an intermediate heat transfer fluid such as a heat pipe or air-to-water-to-air heat exchange system, etc. Air motion through the heat exchanger and cooling means could be effected by one or more fans, blowers or other devices able to create an air flow.

Figure 1:
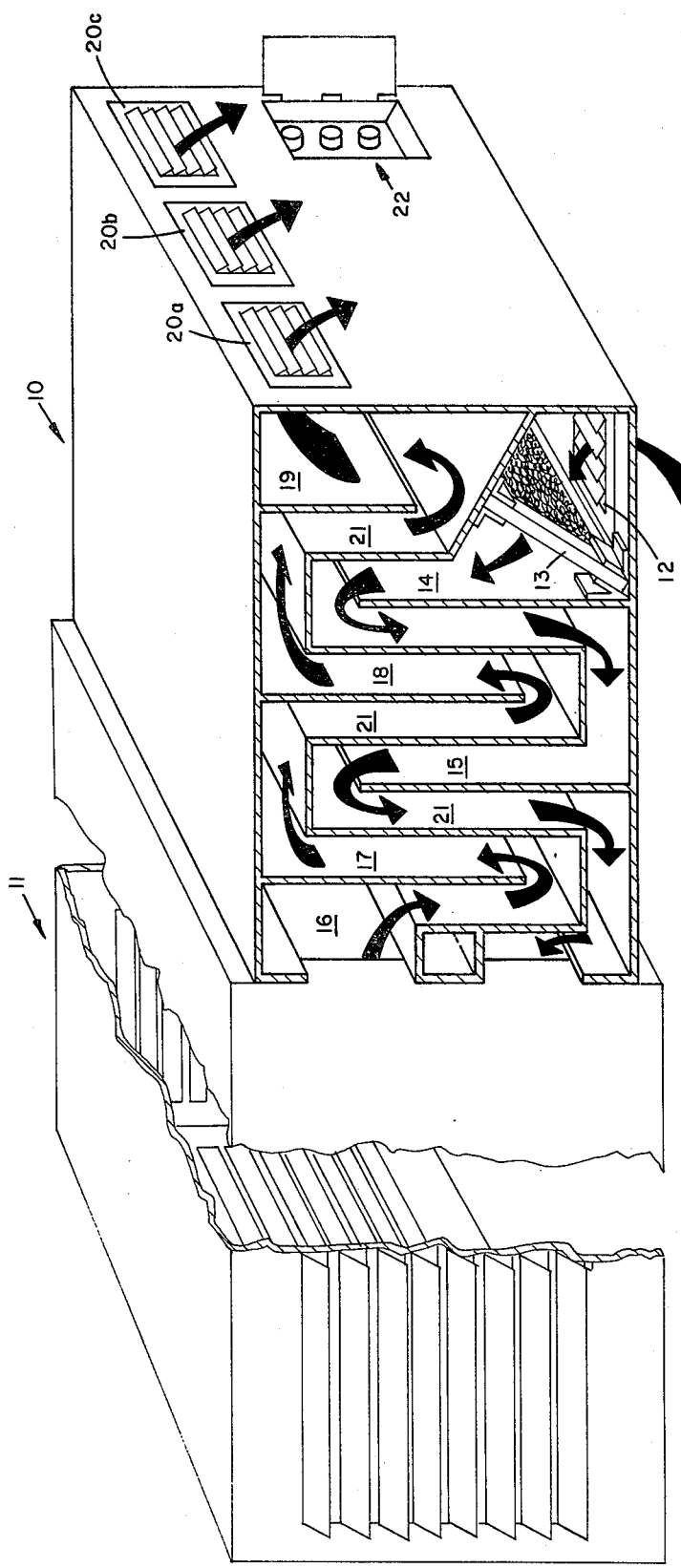
FIG. 1 is a schematic view of a first embodiment showing a heat exchanger attached to a conventional window type air conditioner.

Both a conventional air conditioner and this invention can, under a range of ambient temperature and humidity conditions, produce dehumidification. By way of example, and not by limitation to explain the theory, the dehumidification process in a conventional air conditioner will be compared to the dehumidification process by the apparatus and method of this invention. For this example the invention apparatus is composed of a conventional air conditioner acting as the cooling means and a counter flow air-to-air heat exchanger as shown in FIG. 1.

The apparatus and method of the invention differs from the standard air conditioner in that incoming air is significantly cooled in the heat transferring means before the air reaches the cooling means which in this case would be the cooling coils or evaporator coils of the air conditioner. The incoming air may even reach the dew point in the air-to-air heat exchanger before reaching the cooling coils of the air conditioner. This is made possible by the outgoing air which is considerably cooler than the incoming air. The cool outgoing air does not return immediately to the conditioned environment but rather passes out through the heat transferring means during which time its potential to assist dehumidification is realized as it precools the incoming air. The process in the heat exchanger can be considered a recovery of the valuable cooling power of the outgoing air. The air conditioner acting alone without the heat exchanger dumps the cold air directly into the conditioned room. Thus, the heat pump capacity of the air conditioner is largely used to cool the room and only a limited amount of dehumidification is accomplished. The same air conditioner connected to a heat exchanger, as the two component invention, uses its heat pump capacity largely for dehumidification with only a small amount of cooling in addition. In either configuration the electrical energy consumed is virtually the same so the invention is much more energy efficient at dehumidification than just the air conditioner acting alone.

Experiments have been performed which substantiate the theory. Additional clarification of the theory is made as the experimental analysis and results are explained. The experimental apparatus consisted of two identical air conditioners, one made into the invention configuration by attachment of an air-to-air heat exchanger (similar to FIG. 1) and the other air conditioner acting alone as the comparison or experimental control. Room air temperature and relative humidity were measured as were inlet and outlet air temperatures of both air conditioners and the heat exchanger. Power consumption to each air conditioner was measured (the heat exchanger is unpowered and has no moving parts) and the condensate from both systems was collected. It was found that the invention did work as the theory predicted.

Figure 2:
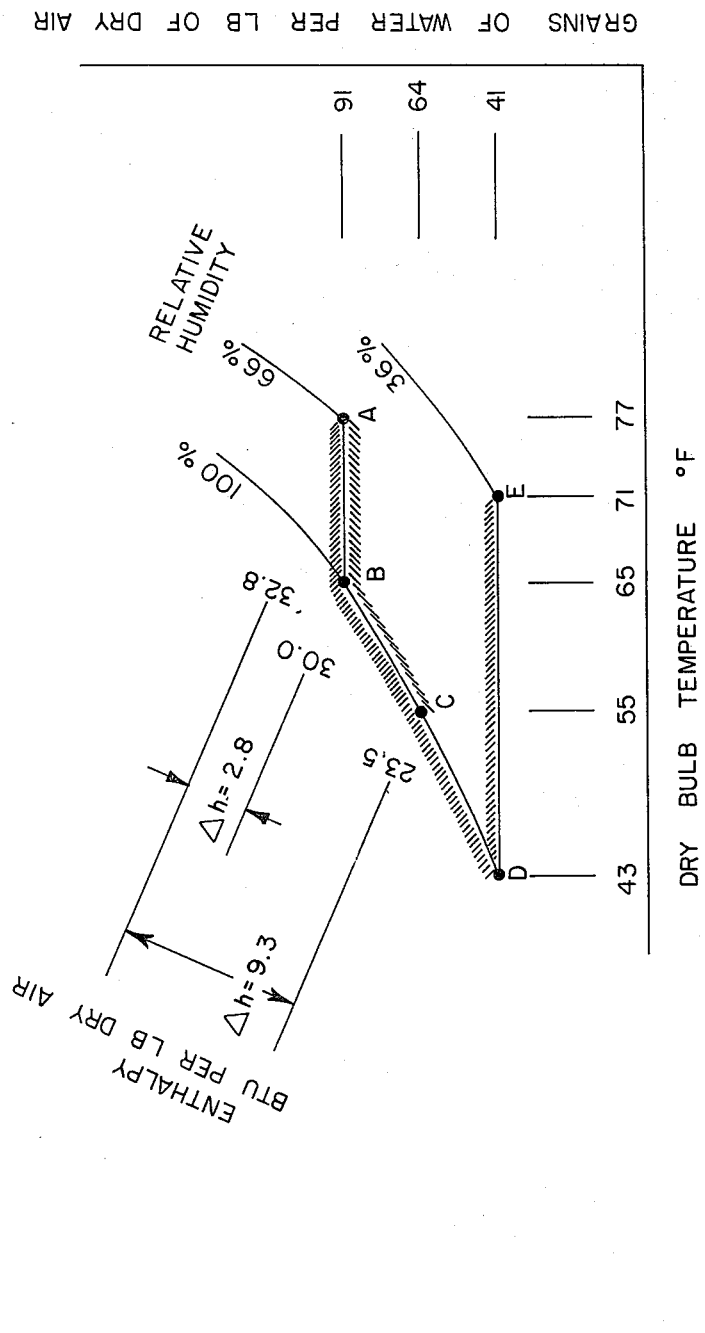
FIG. 2 is a psychrometric chart comparing the invention with a standard air conditioner.

The analysis of one experiment shows an actual operating comparison between a conventional air conditioner and the invention. The inlet conditions (room conditions) for both systems was 77° F. and 66% relative humidity. The temperature and humidity of a typical packet (one pound) of air are traced on a psychrometric chart as air moves through the respective systems. Referring to FIG. 2 of the drawings, there is shown the psychrometric chart for this experiment. In particular, the chart is in the form of a graph with temperature on the "X" axis and grains of water per pound of dry air on the "Y" axis. The horizontal lines on the chart are constant moisture lines. The relative humidity and enthalpy lines are at angles to the constant moisture lines.

The conventional air conditioner performed as follows. The air entered the cooling coil section at Point A, with the room condition of 77° F. and 66% relative humidity. As the air flows over the first cold coils it is first cooled along line AB at constant moisture content until the temperature is reduced to the dew point of approximately 65° F. Then the air moves along the curved path BC during which condensation occurs and the dew point, which is a measure of the amount of moisture in the air, is reduced. Point C is the state of the air as it left the air conditioner and reentered the room. The total moisture removal was 91−64=27 grains of water and the heat or enthalpy pumped out of the room by the air conditioner was 9.3 Btu's.

The form of the invention tested similar to FIG. 1 performed as follows: The air entered the heat exchanger at Point A, 77° F. and 66% RH. As the air progressed through the heat exchanger it was cooled to 58° F. as measured just before the air contacted the cooling coils of the air conditioner. Note that path AB and part of BC had been traversed. The air had not only been cooled to the dew point of the room air, Point B, 65° F., but the dew point occurred in the heat exchanger even before the air reached the air conditioner. Entering the air conditioner cooling coil at 58° F. the air was cooled to a low of 43° F. The 43° F. dewpoint corresponds to a moisture content of 41 grains per pound. Total moisture removal was 91−41=50 grains of water or approximately twice as much as the air conditioner system acting alone could produce. At this stage the enthalpy loss is considerably larger than 9.3 BTU's. Path DE depicts the cooling recovery process of the invention. The 43° F. air exited the air conditioner and reentered the heat exchanger on its outbound path back to the room. The cold air cooled the heat exchanger surfaces which separated the cold air from the warmer incoming air. The farther along the heat exchanger path the cold air traveled the more it warmed up since it progressively transferred its coolness to the incoming air. Since the heat exchanger is in a counter flow configuration the outgoing air is always somewhat cooler than the corresponding incoming air on the other side of the heat exchanger surface. Thus the heat exchange continued until the cool air reenters the room, which is condition E on the chart, 71° F. and 36% relative humidity. As the outgoing air warmed up, its enthalpy increased until the net loss was 9.3 BTU's. The efficiency of the heat exchanger determines the exit temperature relative to the inlet. A more efficient heat exchanger than the one tested could have driven the dew point down to theoretically as low as 36° F. and 30 grams of water. Conversely, a less efficient heat exchanger would result in less efficient dehumidification.

Viewed from an energy consumption and comfort standpoint, a larger air conditioner acting alone with throttled air flow could also have reduced the dew point of the processed air to 43° F. but at greater energy consumption. Furthermore, the 43° F. air dumped directly in the room could progressively cool the room and make it perhaps too cold for comfort. It is believed that individuals within a controlled environment with the method and apparatus of the invention will enjoy greater comfort levels than with conventional air conditioning. In situations where the ambient temperature does not need to be reduced, but rather where only dehumidification is desired, the invention can result in substantial energy savings at about the same initial cost but with much lower operating cost. This is achieved by reducing the amount of Btu capacity of the unit and the time necessary for the unit to operate. Initial cost of a small air conditioner plus heat exchanger may be comparable to the cost of a considerably larger air conditioner of equal dehumidification capacity.

BRIEF DESCRIPTION OF THE PREFERRED EMBODIMENT

Referring to FIG. 1 of the drawings there is shown a first embodiment which includes a heat transferring or counterflow heat exchanger means 10 connected with a conventional air conditioning unit 11. The air conditioning unit 11 is of the type used to cool a single room and is often positioned in a window or opening in a wall.

In operation ambient air from the controlled environment enters the grill 12 and passes through a filter 13. The air then passes over the baffles 14 and 15 and into the air conditioner 11. The air passes through the condensing coils of the air conditioner 11 and out the exhaust port 16 where it strikes baffle 17. The cool air passes around the baffle 17 where it engages the baffle 18, the baffle 19 and out the exhaust grills 20a, 20b and 20c. A winding or labyrinth heat exchange surface 21 is provided whereby the air entering the air conditioner and exhausting the air conditioner passes thereover.

Air entering the grill 12 and passing through the filter 13 will come in contact with the heat exchange surface 21 and as it passes through the heat transferring or heat exchanger means 10, will transfer heat to air being exhausted from the exhaust 16 of the air conditioner. The type and amount of heat exchange surface provided is determined to provide the desired amount of heat transfer so that the air exiting the grills 20a, 20b and 20c is of the desired temperature and humidity.

Suitable control means 22 can be provided to control the air conditioner 11. In the case of existing air conditioners, the heat transferring or heat exchanger means 10 could be designed to fit over the intake and exhaust of the air conditioner while leaving the conventional controls of the air conditioner exposed for controlling this operation. The temperature and humidity of the air entering the controlled environment from the heat transferring and heat exchanger means 10 can be regulated by the thermostat of the air conditioner. Some adjustments or modifications may be required in the air conditioner control systems.

Figure 3:
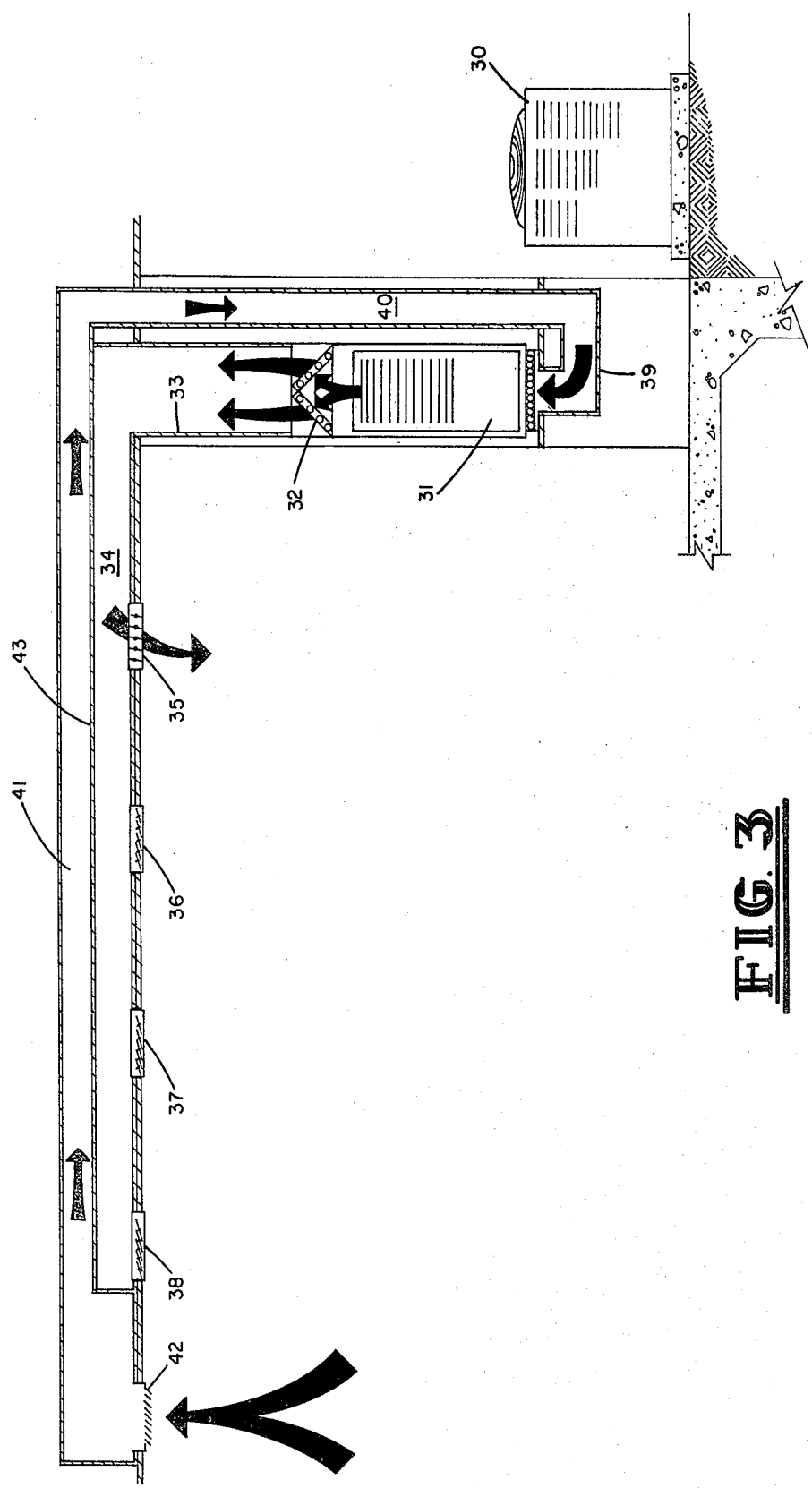
FIG. 3 is a schematic view partly in cross section showing an embodiment of the invention used in connection with a conventional, central heating and air conditioning systems.

Referring to FIG. 3 of the drawing there is shown an embodiment of the invention which might be used with existing central heating and air conditioning systems. The device uses a conventional condenser 30 and a conventional forced air furnace 31. In its air conditioning mode the condenser is activated and air passes through the cooling coils 32 and into the conduit or duct 33. Conduit portion 33 extends upwardly and communicates with a horizontal conduit portion 34. A plurality of selectively closable grills 35, 36, 37 and 38 is provided along the length of the conduit 34. The grill 35 as shown in its opened position so that air will be exhausted through it with the grills 36, 37, and 38 shown in their closed positions.

The return air conduit 39 is connected with a vertical conduit 40 which extends upwardly into communication with a horizontal conduit portion 41 which terminates in an inlet grill 42 where air enters the return air conduit.

In operation the blower motor of the furnace 31 is activated providing for a flow of air as shown by the arrows in the conduit. The condensor 30 may then be selectively activated to cool the cooling coils 32.

The system shown is FIG. 3 permits varying the amount of heat transferred from the air entering the grill 42 to the air exiting one or more of the grills 35, 36, 37 and 38. The heat transfer surface 43, which is schematically shown can be selectively utilized depending on which of the grills 35, 36, 37 or 38 is open. If only grill 38 is open, then maximum heat transfer of the entering air will be supplied to the exiting air which will result in greater dehumidification and a higher temperature for the air exiting grill 38. This would be utilized in conditions where the temperature was in the comfortable range but the atmosphere in the controlled environment was uncomfortable due to excess humidity. In situations when the temperature in the controlled environment exceeded a comfortable range then cooling could be provided by varying the amount of heat transfer surface 43 which was utilized. As will be apparent, as one progresses from right to left in FIG. 3 selectively opening and closing the grills 35, 36, 37 or 38 the amount of heat transfer surface utilized would decrease.

Figure 4:
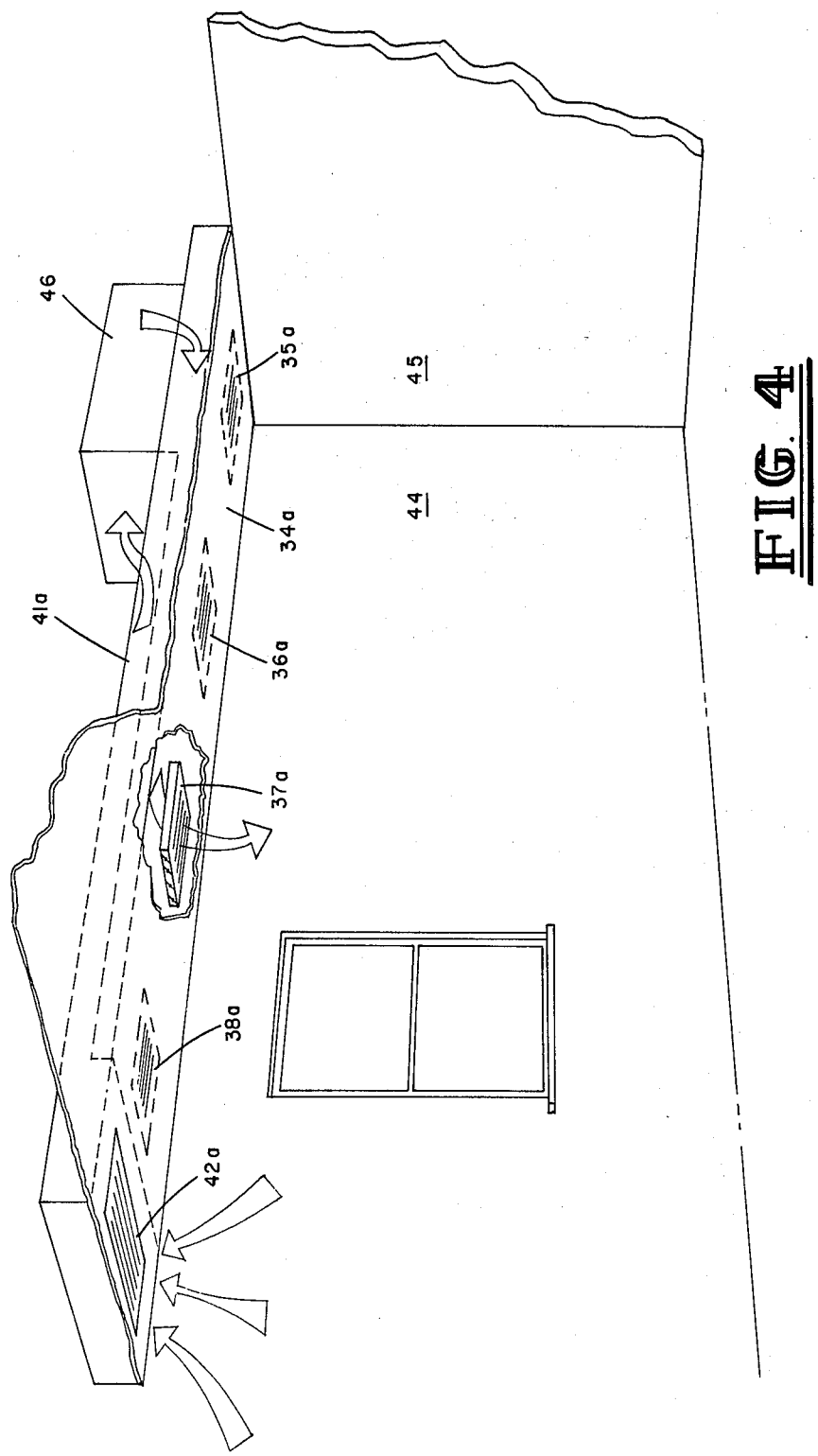
FIG. 4 is a schematic view of another embodiment of the invention.

Another embodiment of the system of the invention is shown in FIG. 4. This embodiment is similar to that shown in FIG. 3 in that it includes a horizontal conduit portion 34a for directing air into the room defined by the walls 44 and 45 and additional walls (not shown). A return air conduit portion 41a is also provided to direct air to a heat exchange unit 46. The conduits 34a and 41a include a heat exchange surface (not shown) which may be the same as heat exchange surface 43 in FIG. 3. Air is drawn into the grill 42a and passes over the heat exchange surface into the cooling and heating means 46. This may take the form of a condensor or the like for receiving heated or chilled water to provide cooling or heating as desired. The air passes through the cooling and heating means 46 into the conduit 34a where it is selectively vented through vents 35a, 36a, 37a and 38a. As shown in the drawing, the vent 37a is open to provide the desired amount of heat exchange between the air in the conduits 34a and 41a to provide a predetermined amount of dehumidification.

Figure 5:
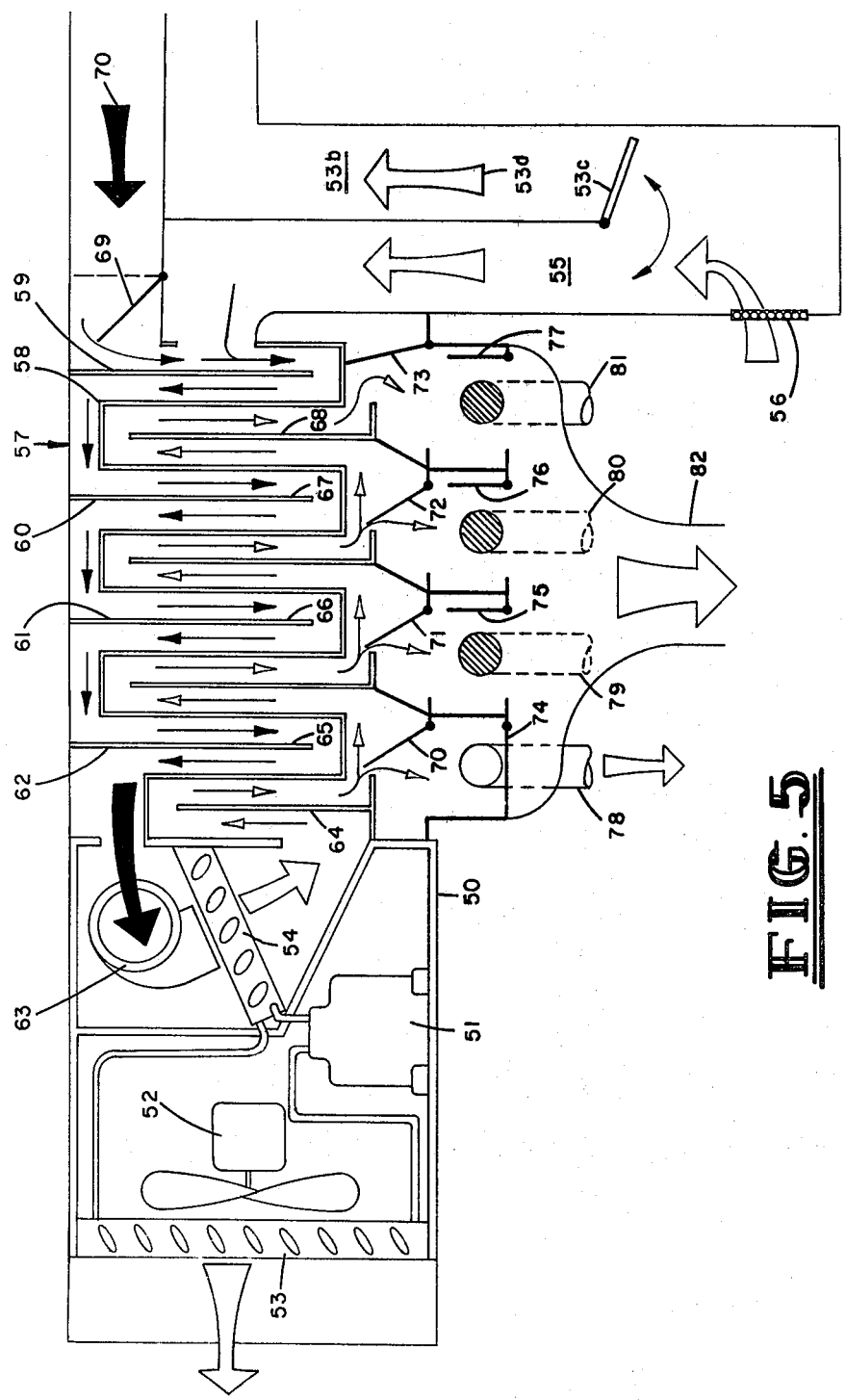
FIG. 5 is a schematic view of an embodiment of the invention partly in cross section showing another embodiment of the invention.

Another embodiment of the invention is shown in FIG. 5. This embodiment includes a cooling means 50 which may be a conventional commercial type air conditioner. The cooling means 50 includes a compressor 51, fan 52, which blows through coil means 53. A cooling coil 54 is provided to cool air flowing into the cooling means 50. Air exiting the coil means 53 carries heat from the cooling means to the atmosphere as indicated by arrow 53a. The duct 53b can exhaust contaminated air from the controlled environment. Damper 53c controls whether air is recirculated or exhausted. The exhausted air represented by the arrow could pre-cool the incoming air represented by arrow 70. The cooling means 50 is of conventional type constructions so no further description is provided. Other types of cooling means could be used. One example is the use of water chilled which is directed through cooling coils.

In operation, air enters the return air conduit 55 through grill 56. The grill 56 is positioned within the controlled environment such as a building as is well known in the art. Air passes through the return air conduit 55 into a heat transferring or heat exchanging means 57.

The heat transferring or heat exchanging means 57 includes a heat exchange surface 58 which has a predetermined heat exchanging capacity. A plurality of baffles, 59, 60 and 62 direct incoming air and provide mixing of the air to increase heat transfer. Air passing through the heat transferring and heat exchanging means 57 is directed to a conduit 63 which directs the air into the cooling coil 54. Cooling coil 54 is a condensing coil in that it is cooled which results in condensation of moisture in the air. This condensate is directed out of the unit in a conventional manner.

The air passing through the cooling coil is directed out of the heat exchanger via baffles 64, 65, 66, 67, and 68.

A plurality of dampers is provided to control the amount of heat exchange in the air. A first baffle 69 provides for fresh air or recirculation. The dark arrow, 70 represents outside air. When the damper 69 is in its vertical position, recirculation occurs with air passing through the grill 56.

A plurality of dampers 70, 71, 72, and 73 determine the amount of heat transfer between the air entering the heat transferring or heat exchanging means 57 and the air passing out of it. In particular, when the dampers, 70, 71 and 72 are substantially closed, as shown in FIG. 5, a substantial portion of the air leaving the cooling coil 54 passes through the heat exchanger past the damper 73. This results in substantial heat exchange and increased dehumidification. The temperature of the air exiting the heat exchanger is also involved. Suitable control means are provided to alternately open and close the dampers 70, 71, 72 and 73 to provide the desired heat transfer and dehumidification.

A plurality of dampers 74, 75, 76 and 77 is also provided to alternately direct air through the conduits 78, 79, 80 and 81 or through the large main conduit 82. As will be apparent, the dampers 74, 75, 76 and 77 as well as the dampers 70, 71, 72, 73 and 69 may be selectively opened and closed to provide the desired amount of heat exchange and dehumidification as well as to direct the air leaving the heat exchanger into different rooms or areas of the controlled environment.

While there has been shown and described a preferred embodiment of an air apparatus and method for passive cooling system in accordance with the invention, it will be appreciated that many changes and modifications may be made therein without, however, departing from the essential spirit of the invention within the scope of the claims.

I claim:

1. A method for efficiently producing dry air, comprising the steps of:

flowing incoming air from an enclosure through the inbound portion of an air-to-air heat exchanger where it is precooled by outgoing air flowing though the outbound portion of said heat exchanger into the enclosure;

flowing the air that has been precooled from the inbound portion to a cooling means for reducing the dew point temperature where it is further cooled and dehumidified to provide cold dry air to the outgoing portion;

flowing the cold dry air from the cooling means through said outbound portion of said air-to-air heat exchanger to recover cooling provided by the cooling means and to provide said precooling of the incoming air;

flowing the dry outgoing air out of the outbound section of the air-to-air heat exchanger into the enclosure; and varying the amount of cooling recovered from the cold dry air flowing through the outbound portion of the heat exchanger to vary the temperature and humidity of the air exiting the outbound portion.

2. An apparatus for efficiently producing dry air comprising:

an air cooling means for reducing the dew point temperature of air flowing across the cooling means to provide cold dry air;

an air-to-air heat exchanger having an inbound section and an outbound section;

said inbound section being connected with the cooling means to provide the air flowing across the cooling means;

said outbound section being connected with the cooling means to receive the cold dry air from the cooling means;

said inbound and outbound sections being thermally connected with each other to transfer cooling from outbound air to inbound air to provide precooling of the air flowing through the inbound section from an enclosure and flowing the outbound dry air out of the outbound section of the heat exchanger into the enclosure; and the air-to-air heat exchanger includes means to selectively vary the amount of cooling transferred from the outbound air to the inbound air.

3. The method as set forth in claim 1 wherein:

the dry outgoing air is flowed out of the heat exchanger at substantially the temperature outside the heat exchanger in the enclosure.

4. The apparatus as set forth in claim 2, wherein:

the air-to-air heat exchanger has a labyrinth heat exchange surface.

* * * * *